Patented June 8, 1943

2,321,552

UNITED STATES PATENT OFFICE 2,321,552

LATEX COAGULATION

Herbert A. Lubs, Wilmington, Del., assignor to E. I. du Pont de Nemours & Company, Wilmington, Del., a corporation of Delaware No Drawing. Application April 5, 1940, Serial No. 328,031

5 Claims. (Cl. 260—821)

This invention relates to the coagulation of rubber latex and more particularly to the coagulation of rubber latex by use of organic acids.

In the production of rubber, one of the first steps after obtaining the milky-white latex from the plantation is that of treating the fluid latex to separate out its rubber content. Generally, this separation has been accomplished by first diluting the latex to a given concentration, using water, and thereafter treating the resultant diluted latex product with substances which have the effect of coagulating the rubber contained in the latex to a single mass called the coagulum. Thereafter the coagulum is removed from the resultant solution by decantation of the supernatant liquid.

Various substances have previously been proposed as coagulants but many disadvantages have been encountered in their use. For example, inorganic acids such as hydrochloric and sulfuric acids have previously been proposed as coagulants, as well as such organic acids as oxalic, formic and acetic acids, the latter two having been widely used for this purpose. None of these materials has been entirely free from disadvantages in their use as coagulants.

These disadvantages may be made more apparent by summarizing the properties which an ideal rubber latex coagulant should possess, as recognized by those who are skilled in the art. Among said properties of an ideal rubber latex coagulant are the following:

1. It should be an acidic material whose strength as an acid should lie somewhere within the range of acidity which is defined on the one hand by the acidity of formic acid, a relatively strong acid, and on the other hand by the acidity of acetic acid, a relatively weak acid.

2. It should be readily soluble in water, in order that it may be added to the latex in aqueous solution and removed readily and completely from the coagulum by washing with water.

3. It should leave no inorganic residues on evaporation, or other means, if removed from the coaglum, said inorganic residues tending to have a deleterious effect upon the subsequent working up and processing of the coagulated rubber. It should therefore preferably be an acidic material containing only carbon, hydrogen and oxygen.

4. It should preferably have a low order of volatility, in order to keep losses due to evaporation during shipping and handling at a minimum.

5. It should be capable of being stored and transported in non-metallic containers, in order to avoid difficulties arising on the one hand from corrosion and leakage of the containers and on the other hand from the introduction into the coagulating bath of corrosion products such as metallic salts which are difficultly removable and, if left in, have a deleterious effect upon the properties of the finished rubber, both as regards imparted color and strength as well as stability.

6. It should be capable of effecting complete coagulation of the rubber latex when added to said latex in relatively small amounts but should cause no harmful effects, for example, by making the solution excessively acid if used in amounts considerably greater than those required for complete coagulation of the rubber latex.

These ideal properties of a rubber latex coagulant have not heretofore been met by the substances which have been proposed as coagulants. Thus, inorganic acids such as hydrochloric and sulfuric acids have previously been proposed as coagulants, but their use has resulted in corrosive effects on the vessels used in their transportation, in the introduction of metallic and other impurities into the coagulating bath, and in the leaving of inorganic residues in the coagulated rubber. Moreover, the use of strong inorganic acids such as hydrochloric and sulfuric acids necessitates close control and supervision during the addition of the coagulant to the rubber latex, in order to avoid the addition of a harmful excess of the inorganic acid. Organic acids such as formic and acetic acids have been widely used as coagulants, but they suffer from the disadvantage of being relatively volatile, corrosive materials, difficult of transport and storage without loss.

It is an object of this invention to overcome the disadvantages of the prior art and to provide a new and improved coagulant for use in the rubber-making processes.

Other objects and advantages of this invention will be apparent from the following specification.

According to this invention coagulation of rubber latex is accomplished by addition thereto of relatively small quantities of glycolic acid, following which the resulting coagulum may be removed by decantation of the remaining supernatant liquid.

It has been found not only that glycolic acid satisfies all of the above properties of an ideal rubber latex coagulant, but in addition that it has the totally unexpected property of effecting complete coagulation of the rubber latex when added in much smaller amounts than other previously proposed organic acid coagulants, as for example, acetic acid. This advantage of glycolic acid is even more apparent when the amounts of acids required for complete coagulation of the rubber are compared on the basis of the equivalent weights of the acids. For example, 335 parts by weight of glycolic acid, or 4.4 moles, has been found, in an experimental run, to be equivalent to 1000 parts of acetic acid (16.7 moles) or 539 parts of formic acid (11.7 moles) in effecting complete coagulation of rubber latex.

The proportions of glycolic acid used may vary over a wide range, preferably from 0.1 to 0.5% based upon the weight of the rubber although, if the coagulation and separation of the rubber are to be accelerated, the amount of glycolic acid used may be increased by about 25% without appreciable deleterious effect. Inasmuch as the primary effect of an excess of coagulant is one of increasing the time of vulcanization of the resulant rubber, much higher percentages of acid may be utilized if desired and if some slight sacrifice is increased vulcanization time can be accepted. Thus, for example, excesses as high as 300% above the preferred range of acid previously mentioned may be employed without permanent adverse effect upon the resultant rubber.

According to a preferred embodiment of this invention, after removing flocculated matter from rubber latex, and after the rubber content of the latex has been determined, the whole mass of the latex is diluted with water to a definite degree such, for example, that it may have a dry rubber content of 15%. Thereafter, 3 parts of glycolic acid solution are added to 100 parts of the 15% latex solution so that the resulting mixture contains approximately 4 parts of glycolic acid per 1000 parts of rubber by weight. Preferably, the glycolic acid solution is prepared by the dissolving of glycolic acid in water so that there will be present a concentration of about 2% glycolic acid in the glycolic acid solution.

The resulting latex solution containing the coagulant is thereafter continuously agitated, the foam on the surface of the solution is removed and thereafter the coagulum produced is removed and transferred to washing machines where the residual liquid is removed from the coagulum preferably by passing the coagulum through washing rolls such as commonly used in rubber factories. Thereafter, the resultant crepe or sheets of rubber are dried, if desired, and packaged for transportation.

Various drying methods may be used such as drying in air at ordinary temperatures or by the use of vacuum or hot air, the average length of time for drying being a matter of days or hours dependent upon whether ordinary air drying or hot air drying is utilized. The drying operation removes the last traces of moisture from the coagulum and it may be shipped without danger of corrosive action upon the containers in which it is transported and without danger of oxidation due to slight traces of coagulant which may remain in the final product.

The following example will serve to illustrate the use of glycolic acid as a latex coagulant:

*Example*

To 100 pounds of rubber latex containing 15% dry rubber by weight is added, with agitation, 3 pounds of an aqueous glycolic acid solution containing 2% glycolic acid by weight. The rubber is completely coagulated and the coagulum worked up in the usual manner. Under similar conditions, 9 pounds of 2% aqueous acetic acid solution is required for complete coagulation of the rubber.

One of the primary advantages of the present invention resides in the fact that the amount of glycolic acid needed for coagulating the rubber content of latex solutions is considerably less than the amount of coagulant used in present coagulating methods. A further advantage of the present invention resides in the fact that, being a solid, glycolic acid is admirably fitted for easy packaging and transportation, and furthermore, there is no danger of evaporation or loss of a liquid such as previously employed for coagulating latex.

Although particular reference has been made, in the foregoing specification and example, to use of glycolic acid, it should be understood that this invention also comprises within its scope the use of materials which would hydrolyze, under the conditions of latex coagulation, such as for example, glycolic acid esters, glycolic acid salts of weak bases, glycolic acid anhydrides, and glycolide.

Various changes may be made in the details and preferred embodiments of this invention without departing therefrom or sacrificing any of the advantages thereof.

I claim:

1. A process for coagulating rubber latex which comprises adding thereto glycolic acid as a principal coagulant, and separating the resultant coagulated rubber.

2. A process for coagulating rubber latex which comprises adding thereto from 0.1 to 0.5% glycolic acid, based upon the weight of the dry rubber, and separating the resultant coagulated rubber.

3. A process for coagulating rubber latex without adversely effecting the subsequent vulcanization thereof which consists in adding thereto from 0.1 to 1.5% glycolic acid, based upon the weight of the dry rubber, and separating the resultant coagulated rubber.

4. A process for coagulating rubber latex which comprises adding thereto from 0.1 to 1.5% glycolic acid, based upon the weight of the dry rubber, and separating a coagulum containing substantially all of the rubber in the said latex.

5. The process which comprises diluting crude rubber latex with water to a 15% by weight dry rubber content, agitating the diluted latex and incorporating therein about 3 parts by weight of aqueous 2% glycolic acid solution to each 100 parts by weight of the said 15% latex, and separating a coagulum containing substantially all of the rubber originally present.

HERBERT A. LUBS.